(12) United States Patent
Hardin et al.

(10) Patent No.: US 7,408,654 B1
(45) Date of Patent: Aug. 5, 2008

(54) METHOD FOR MEASURING POSITION, LINEAR VELOCITY AND VELOCITY CHANGE OF AN OBJECT IN TWO-DIMENSIONAL MOTION

(76) Inventors: Mark Randall Hardin, P.O. Box 7153, Burbank, CA (US) 91510; Mark Alan Hotchkiss, 4351 Clark Ave., Long Beach, CA (US) 90808

( * ) Notice: Subject to any disclaimer, the term of this patent is extended or adjusted under 35 U.S.C. 154(b) by 0 days.

(21) Appl. No.: 11/710,336

(22) Filed: Feb. 23, 2007

Related U.S. Application Data

(63) Continuation-in-part of application No. 10/711,231, filed on Sep. 2, 2004, now abandoned.

(51) Int. Cl.
| | | |
|---|---|---|
| G01D 5/347 | (2006.01) | |
| G03B 19/18 | (2006.01) | |
| G01B 11/14 | (2006.01) | |

(52) U.S. Cl. .................. 356/617; 356/614; 356/615; 352/53; 33/707

(58) Field of Classification Search ......... 365/614–617, 365/619; 33/707; 352/53; 356/614–617, 356/619, 27–28
See application file for complete search history.

(56) References Cited

U.S. PATENT DOCUMENTS

| | | | |
|---|---|---|---|
| 2,845,710 A | | 8/1958 | Claret et al. |
| 3,598,355 A | * | 8/1971 | English ..................... 396/428 |
| 3,896,377 A | * | 7/1975 | Richardson ................. 324/161 |
| 4,123,750 A | * | 10/1978 | Leney et al. ................. 341/11 |
| 4,327,362 A | * | 4/1982 | Hoss ..................... 340/870.02 |
| 4,395,630 A | | 7/1983 | Ramsden et al. |
| 4,477,189 A | | 10/1984 | Ernst |
| 4,572,952 A | * | 2/1986 | March ..................... 250/237 G |
| 4,667,099 A | * | 5/1987 | Arai et al. ................... 250/235 |
| 4,793,067 A | | 12/1988 | Reimar et al. |
| 4,959,542 A | * | 9/1990 | Stephens ................. 250/237 G |
| 4,959,798 A | * | 9/1990 | Gordon et al. ................. 701/28 |
| 4,989,193 A | | 1/1991 | Tinet |
| 5,008,804 A | * | 4/1991 | Gordon et al. ................. 700/62 |
| 5,138,154 A | | 8/1992 | Hotelling |
| 5,253,531 A | | 10/1993 | Walker et al. |
| 5,296,090 A | | 3/1994 | Solares et al. |
| 5,404,226 A | | 4/1995 | Kellner |
| 5,434,602 A | * | 7/1995 | Kaburagi et al. ........ 346/139 R |
| 5,457,370 A | * | 10/1995 | Edwards ..................... 318/571 |
| 5,471,054 A | * | 11/1995 | Watanabe ............... 250/231.13 |
| 5,590,059 A | * | 12/1996 | Schier ........................ 702/151 |

(Continued)

OTHER PUBLICATIONS

Pittman 35mm ROSE Encoder, http://www.clickautomation.com/PDF/categories/Rose%20Encoder%20information.pdf, dated Aug. 14, 2003.*

(Continued)

Primary Examiner—Gregory J Toatley, Jr.
Assistant Examiner—Bryan Giglio

(57) ABSTRACT

A system for reproducibly measuring motion along surfaces of arbitrary or indeterminate length and of arbitrary curvature, using an opto-electronic sensor mounted to an object in motion along the surfaces. The system involves the detection of alternating reflective and non-reflective markings, on surfaces which can be curved in a certain dimension and can be of any length. Additionally, the system can be applied to measure the motion of camera carts or dollies along straight track, curved track, or any combination of straight and curved track.

18 Claims, 2 Drawing Sheets

U.S. PATENT DOCUMENTS

| | | | |
|---|---|---|---|
| 6,181,658 | B1 | 1/2001 | Van Den Enden et al. |
| 6,220,172 | B1 | 4/2001 | Day |
| 6,413,702 | B1 * | 7/2002 | Hercher .................. 430/321 |
| 6,520,641 | B1 * | 2/2003 | Walton et al. .............. 352/243 |
| 6,523,957 | B1 | 2/2003 | Walton et al. |
| 6,588,333 | B1 * | 7/2003 | Homer et al. ............... 101/32 |
| 6,695,668 | B2 | 2/2004 | Donahue et al. |
| 6,791,699 | B2 | 9/2004 | Aoki |
| 6,820,980 | B1 * | 11/2004 | Romanoff et al. ........... 352/243 |
| 6,834,960 | B2 * | 12/2004 | Dbjay ..................... 352/243 |
| 6,957,773 | B2 * | 10/2005 | Gelbart .................... 235/454 |
| 6,963,064 | B2 | 11/2005 | Updegrave |
| 7,101,045 | B2 * | 9/2006 | Romanoff et al. ........... 352/243 |
| 7,161,620 | B2 * | 1/2007 | Watanabe et al. ...... 348/207.99 |
| 2002/0018220 | A1 * | 2/2002 | Aoki ....................... 356/614 |
| 2003/0230708 | A1 | 12/2003 | Updegrave |
| 2006/0035753 | A1 * | 2/2006 | Baker ...................... 482/51 |
| 2007/0240325 | A1 * | 10/2007 | Pelsue et al. ............... 33/707 |

OTHER PUBLICATIONS

Design and Performance Considerations with the Agilent HEDR-8000, http://www.avagotech.com/pc/downloadDocument.do?id=4608, dated Aug. 20, 2002 (Copyright 2002).*

* cited by examiner

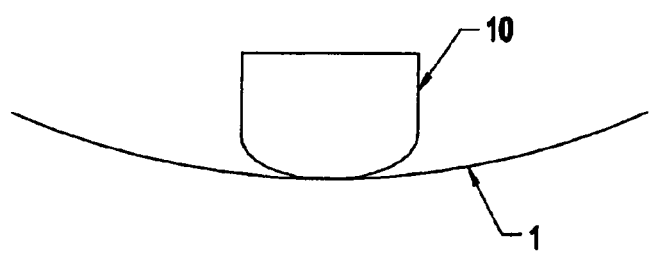
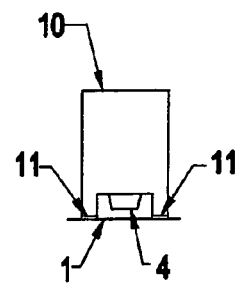
Fig. 3    Fig. 4
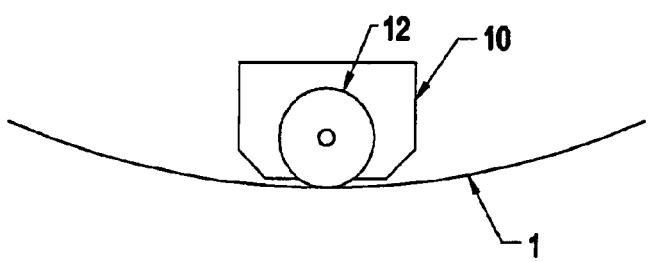
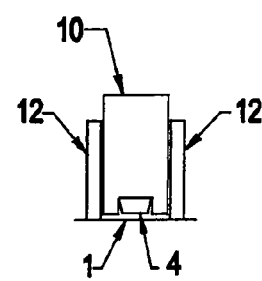
Fig. 5    Fig. 6
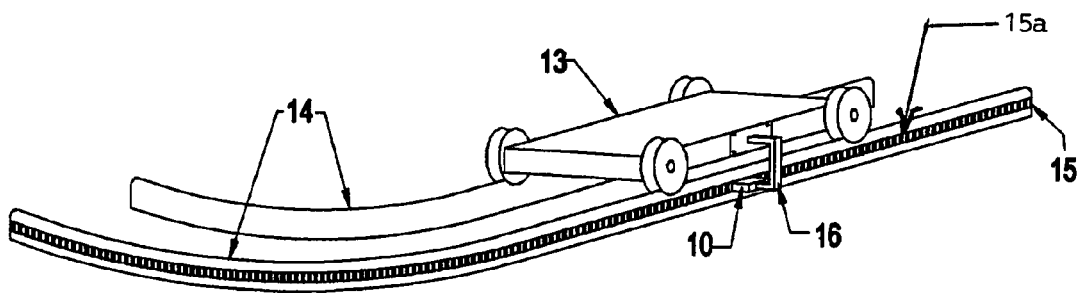
Fig. 7

METHOD FOR MEASURING POSITION, LINEAR VELOCITY AND VELOCITY CHANGE OF AN OBJECT IN TWO-DIMENSIONAL MOTION

This application is a continuation in part of application Ser. No. 10/711,231, filed Sep. 2, 2004 now abandoned.

BACKGROUND OF THE INVENTION

It is frequently desirable to analyze the motion of an object moving in two dimensions. That is, to determine its speed, acceleration, or location on a real time basis. As an example, the side view film of automobile crash tests is commonly seen, but for valid testing, much more precise measurements of the vehicle and the characteristics of its motion along a constraint path may be required. Another field that requires precise measurements of a moving object's position, velocity and acceleration is that of motion pictures—in which photographic, or electronic recordings of a scene are captured.

Motion picture visual effects often require the photography of multiple individual images which must be combined to form one integrated image. If that composite image is intended to appear as from a spatially moving viewpoint, then all the aforementioned individual images may also be required to be imaged from that identical moving viewpoint. The process of repeatably imaging a physically moving viewpoint forms the basis for what is commonly known as "motion-control" photography, in which motorized devices move the viewpoint in predetermined or recordable trajectories or spatial pathways. In some cases, a viewpoint's spatial path may need to be recorded for other purposes, such as acquiring the data necessary for computer generated imagery, a process commonly referred to as "motion capture".

One of the more difficult of the types of motion to accurately measure has been the two dimensional movement of a camera cart, or "dolly", along the track it rides upon. Factors contributing to this difficulty include the variable and potentially long distances—well over one hundred feet in some cases—over which the dolly may travel, and that some sections of track may need to be curved. The track itself is not unlike a small railroad track, with about a two foot spread between rails, the rails being typically about two inches high. The tops of the rails are convex, and the dolly's wheels are concave, or in some cases "V" shaped to provide a wedge fit to the rail.

Several types of approach have been taken in the past to attempt accurate measurement between dolly and track. The approach most frequently taken consists of measuring the motion of a motor driving the dolly. Whether the drive mechanism to which the motor is attached is based on mechanical principles such as rack-and-pinion gearing, timing belt, friction drive or other such means, these drives may ensure repeatable measurements at the drive itself but, due to issues of backlash, compliance, or slippage, measurements taken at the motor in such mechanisms may not necessarily provide an accurate representation of movement between the dolly and the track. In cases where a drive was unnecessary or undesirable, various devices have been used for measurement between dolly and track. A simple friction-contact rubber-wheeled capstan on a common shaft with an encoder, mounted to the dolly and rolling in contact with the track has commonly been used but, due to slippage between capstan and rail, requires frequent recalibration to some reference point on the track. Another approach has been to attach one end of a cable to the dolly, with the cable's opposite end wound on the shaft of a rotary encoder attached to one end of the track, while maintaining constant tension on the cable. Dolly movement in this configuration results in a corresponding encoder shaft rotation, allowing a resultant encoder signal to be generated. Measurement inaccuracy in such applications can result due to elasticity in the cable, and applications requiring the use of curved track sections have prohibited use of this approach.

In film and video production, minimizing setup time is considered to be of great importance. These aforementioned track drive measurement implementations share common drawbacks in such an environment: they may require considerable time to assemble mechanical and electronic components, to align these components, and to calibrate the system to known reference points and in meaningful units of measurement.

The goal of this new approach is a two dimensional measurement method that, among other advantages in the field of motion picture production, is quick and easy to use, is capable of maintaining its measurement accuracy in situations where there may be backlash in the drive, can be used with combinations of straight and curved track, works with or without an external drive, and may be used with most existing track and drive systems. Of course in the general sense of recording the movement of an object other than a camera, many of the same advantages can be realized.

This new method comprises placing a sensor on the moving object (in the case of a camera, the dolly) and affixing markings along the surface over which the object moves (in the case of a dolly, some surface of the track). Naturally, in other applications, the surface could move, and the object remain stationary. The sensor detects and decodes the markings to produce information about the object's motion in real-time, whether that information is position, velocity or acceleration. The information may be used simply to record the motion, or even used to close a servo loop. This approach works well whether an external force moves the object, or when internal power drives the object.

BRIEF DESCRIPTION OF THE DRAWINGS

FIG. 3 is a top view of a housing for the sensor, shown in contact with a surface curved in the horizontal plane.

FIG. 4 is a side view of the housing in FIG. 3.

FIG. 5 is a top view of a housing for the sensor, shown with a pair of attached wheels rolling in contact with the surface.

FIG. 6 is a side view of the housing in FIG. 5.

FIG. 7 is a perspective view of a typical device using the instant method in a typical application.

DETAILED DESCRIPTION OF THE INVENTION

Figure 1:
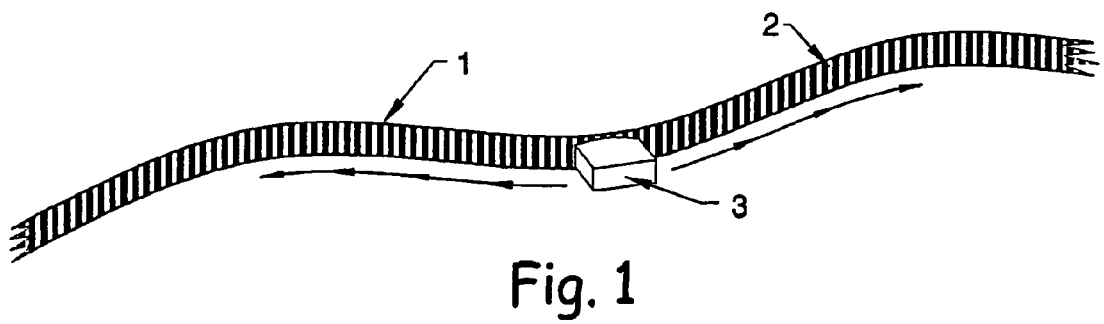
FIG. 1 is a generalized perspective view of a surface, in this case a track (of arbitrary or indeterminate length and curvature) and a sensor moving along it.

FIG. 1 depicts a surface 1 of arbitrary length and curvature, on which are alternating reflective and non-reflective markings 2 and a sensor 3 capable of reading said markings. The markings are typically about 50 to 70 to the inch. Displacement is read by interpreting the sensor's 3 output as it is moved along the surface 1. It should be noted that the markings 2 may be reflective in the sense of mirror-like, or may be light and dark, presuming the contrast is detectible by the encoder module.

Figure 2:
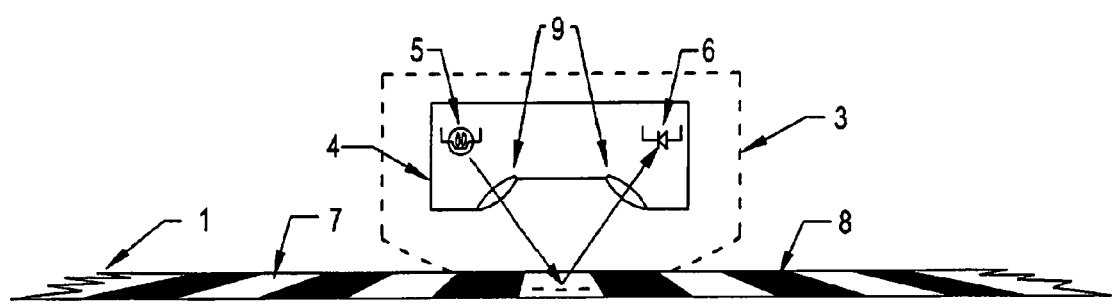
FIG. 2 shows the sensor in centered-cross-section top view, and the surface it is reading shown in slight perspective. Essential elements of the sensor are shown in diagrammatical form.

FIG. 2 shows the optics 4 of the sensor 3, consisting of a light source 5 and one or more light detectors 6. A plurality of detectors can be utilized in order to assist in taking accurate measurements from a surface with occasional irregularities in its markings, and in order to increase overall precision. Data from detectors reading different areas of the same surface can be compared in order to discard data from one detector's erroneous signal, or to average detectors' readings in order to maximize overall accuracy, or other similar data processing can be applied.

Light from the light source is directed toward the surface 1. If a detector is primarily aligned with one or more reflective area(s) 7 on surface 1, the detector 6 senses reflected light above a predetermined threshold level. Conversely, if a detector is primarily aligned with one or more non-reflective area (s) 8 on surface 1, the light reflected to the detector 6 falls below said threshold level. The output of the light detector will be either on or off, depending on whether the reflected light level is detected as above or below said threshold. As the detector travels from alignment with reflective area(s) to alignment with non-reflective area(s), the reflected light drops below said threshold, and the sensor's output changes states. As the detector travels further to alignment with the next reflective area(s), the sensor's output state changes back again. These state changes may be interpreted by external devices to obtain various measurements.

When two detectors 6 are used, they may be positioned such that their outputs are phased in the same way as a standard industrial quadrature encoder.

Lenses 9 may or may not be used at the light source 5 and/or the detectors 6 to better focus the light.

In summary, the sensor is mounted on an axis perpendicular to the length of the measured surface and coplanar with the width of the measured surface, capable of detecting the alternating reflective and non-reflective markings.

A specific distance between the optics 4 and the surface 1 may be required for proper detector performance.

The emitter 5 and detector 6 are both contained within a commercially available surface-mount electronic encoder chip package, such as the Agilent HEDR-8000 ("-8000"). The -8000, includes a single LED light emitter, a pair of lenses, and a photodetector IC. The chip package of the -8000 is connected to a differential line driver on a printed circuit board with additional components, which allows it to behave as a standard industrial quadrature encoder. The -8000 has been used extensively in the prior art to detect the motion of a rotating surface from the -8000's fixed position. These prior applications have, for instance, allowed the measurement of the rotation of a shaft by using the -8000 to read a radially-lined disc attached perpendicular to the shaft axis, or to read sequential lines wrapped cylindrically around the shaft, each parallel to the axis of the shaft. Of course, all that is measured by the prior art method is the rotation of the shaft, including changes in rotational velocity. Displacement of the shaft other than rotation is not detected in the prior art, and in fact movement other than rotation will skew the measurement of rotational velocity.

The measured surface suitably consists of a flexible tape with one partially reflective side and an adhesive coating applied to its opposite side. A multitude of individual non-reflective markings are continuously and sequentially printed on the tape's reflective side by a seamless-plate flexographic process. It should be noted that the tape must be uniform. That is, the alternate reflective/non-reflective areas must be evenly spaced, and there must be no perceptible breaks or gaps in the tape. By its nature, the adhesive tape can be applied to a surface of any desired length or to a surface of two-dimensional curvature. In the case of a test automobile, for instance, the tape could be affixed to the surface corresponding to the road.

Obviously, there are only two ways to manufacture such a surface of alternating reflective and non-reflective lines; by forming non-reflective lines on a reflective surface; or by forming reflective lines on a non-reflective surface.

Optical characteristics of the emitter and detector may require a specific range of separation between the optics 4 and the surface 1 that the sensor is to read. FIG. 3 and FIG. 4 show an example of a sensor housing. The optics 4 are mounted in a housing 10, which holds the optics rigidly. FIG. 4 shows the parallel runners 11 on both sides of the optics, establishing said separation between optics 4 and surface 1 when housing 10 is held in contact with the surface. Depending on the width of the tape and the configuration of the sensor, these runners can be arranged to ride on the surface to which the tape is adhered, or on the surface of the tape itself. The faces of these runners 11, which are in contact with said surface 1, are shaped to permit travel along surfaces of concave radii.

FIG. 5 and FIG. 6 show a sensor housing which replaces the runners seen in FIG. 3 and FIG. 4 with one, two or more wheels 12. As in FIGS. 3 and 4, the wheels establish the proper separation between optics 4 and surface 1 when housing 10 is held in contact with the surface.

FIG. 7 shows the method in a typical application. A four-wheeled cart or dolly 13 rides constrained on a parallel pair of rails 14, which can be any combination of straight rail or rail curved in a leftward or rightward direction. The tape 15 containing the alternating reflective and non-reflective markings is adhered to a vertical side surface of one or both rails 14. There is a known start mark 15a on the tape 15. In FIG. 7, the tape is shown applied to an outer rail surface. The sensor's housing 10 is held in contact with the surface, or with the tape applied to that surface, by an arm system 16 rigidly attached at its opposite end to the cart 13. The arm system 16 contains a mechanism that applies the required pressure to maintain contact between sensor housing 10 and the surface or tape. In order to maintain the proper contact, the arm's design permits motion between the sensor and the cart in a direction perpendicular to the length of the rails, but motion parallel to the rails is minimized to ensure that measurements at the sensor represent motion of the cart along the rails as closely as possible.

In this typical application's operation, the camera dolly is propelled along the rails at the desired (possibly changing) speed, while the camera photographs the scene. The real-time data from the sensor is recorded via user-selectable means, in the position/velocity/acceleration format most advantageous to the application. This data may be sent to computer graphics applications for use in constructing image elements that will integrate with the movement of the camera as previously recorded. Or, the dolly may be returned to the previously recorded start point, and the recorded data may be played back to control the motion of a motor driving the dolly. The recording of the data of position, velocity or velocity change from the first run allows the second run to exactly (within the relevant limits of measurement and the implemented mechanics) replicate on a real time basis the first run's positions, speed and speed changes. In such subsequent runs, the camera may photograph a variation of the original scene or a different scene for later compositing with the first scene. This may be repeated a third time, and so on, until the desired image elements are obtained to complete the desired composite image.

Although several variants of the method of the present invention have been described in detail for purposes of illustration, various modifications of each may be made without departing from the spirit and scope of the invention. Accordingly, the invention is not to be limited, except as by the appended claims.

What is claimed is:

1. A system for measuring linear position, linear velocity and linear acceleration of an object in relative motion along a surface, said system comprising:
   (a) a curved path for motion in two spatial dimensions, wherein the curved path has a start point and the curved path does not return to the start point;
   (b) a surface length being measured, corresponding to the curved path, wherein the face of the surface length being measured is perpendicular to the two spatial dimensions, and each axis of curvature of the surface length being measured is perpendicular to the two spatial dimensions, the surface length being measured having thereon an uninterrupted continuous multitude of uniform and sequentially spaced alternating reflective and non-reflective markings in linear array along the surface length being measured, and;
   (c) an object in relative motion along said markings, said object mounting an opto-electronic sensor directly detecting said alternating reflective and non-reflective markings, thereby measuring on a real time basis the displacement of said opto-electronic sensor along said surface length being measured.

2. The system of claim 1, wherein said alternating reflective and non-reflective markings are contained on an adhesive tape, which is applied to the surface length being measured which is to be in relative motion to the opto-electronic sensor.

3. The system of claim 1, wherein said surface length being measured is inherently non-reflective and said reflective markings are formed on said non-reflective surface length being measured.

4. The system of claim 1, wherein said surface length being measured is inherently reflective and said non-reflective markings are formed on said reflective surface length being measured.

5. The system of claim 1, wherein the electronic signals of the output of said opto-electronic sensor are made to be compatible with TTL inputs.

6. The system of claim 1, wherein a plurality of said opto-electronic sensors are used.

7. A system for measuring linear position, linear velocity and linear acceleration of an object in relative motion along a surface, said system comprising;
   (a) a combination of straight and curved paths for motion in two spatial dimensions, wherein the combined path has a start point and the path does not return to the start point;
   (b) a surface length being measured, corresponding to the combined straight and curved paths, wherein the face of the surface length being measured is perpendicular to the two spatial dimensions, and each axis of curvature of the surface length being measured is perpendicular to the two spatial dimensions, the surface length being measured having thereon an uninterrupted continuous multitude of uniform and sequentially spaced alternating reflective and non-reflective markings in linear array along the surface length being measured, and;
   (c) an object in relative motion along said markings, said object mounting an opto-electronic sensor directly detecting said alternating reflective and non-reflective markings, thereby measuring on a real time basis the displacement of said opto-electronic sensor along said surface length being measured.

8. The system of claim 7, wherein said alternating reflective and non-reflective markings are contained on an adhesive tape, which is applied to the surface length being measured which is to be in relative motion to the opto-electronic sensor.

9. The system of claim 7, wherein said surface length being measured is inherently non-reflective and said reflective markings are formed on said non-reflective surface length being measured.

10. The system of claim 7, wherein said surface length being measured is inherently reflective and said non-reflective markings are formed on said reflective surface length being measured.

11. The system of claim 7, wherein the electronic signals of the output of said opto-electronic sensor are made to be compatible with TTL inputs.

12. The system of claim 7, wherein a plurality of said opto-electronic sensors are used.

13. A system for measuring linear position, linear velocity and linear acceleration of any camera cart, or any camera dolly, moving along any track, said system comprising;
   (a) a track comprising one or more straight tracks, one or more curved tracks, or any combination thereof, comprised of one or more rails, placed individually or sequentially along an approximate plane;
   (b) a length being measured along said track, having thereon an uninterrupted continuous multitude of uniform and sequentially spaced alternating reflective and non-reflective markings in linear array along said track, and
   (c) a camera cart or camera dolly in relative motion along said track, said camera cart or camera dolly mounting an opto-electronic sensor directly detecting said alternating reflective and non-reflective markings on said track; thereby measuring on a real time basis the displacement of said sensor, and thereby said camera cart or camera dolly, along said length being measured.

14. The system of claim 13, wherein said alternating reflective and non-reflective markings are contained on an adhesive tape, which is applied to said track.

15. The system of claim 13, wherein said track length being measured is inherently non-reflective and said reflective markings are formed on said non-reflective portions of said track length being measured.

16. The system of claim 13, wherein said track length being measured is inherently reflective and said non-reflective markings are formed on said reflective portions of said track length being measured.

17. The system of claim 13, wherein the electronic signals of the output of said opto-electronic sensor are made to be compatible with TTL inputs.

18. The system of claim 13, wherein a plurality of said opto-electronic sensors are used.

\* \* \* \* \*